US008832587B2

(12) United States Patent
Abramson et al.

(10) Patent No.: US 8,832,587 B2
(45) Date of Patent: Sep. 9, 2014

(54) VIDEO WINDOW WITH INTEGRATED CONTENT

(75) Inventors: Sandy Abramson, Freehold, NJ (US); Anthony Frissora, Fair Haven, NJ (US); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 303 days.

(21) Appl. No.: 12/837,139

(22) Filed: Jul. 15, 2010

(65) Prior Publication Data
US 2011/0047500 A1 Feb. 24, 2011

Related U.S. Application Data

(60) Provisional application No. 61/235,838, filed on Aug. 21, 2009.

(51) Int. Cl.
*G06F 3/048* (2013.01)
*G06F 3/00* (2006.01)

(52) U.S. Cl.
USPC .......................................... 715/781; 715/751

(58) Field of Classification Search
None
See application file for complete search history.

(56) References Cited

U.S. PATENT DOCUMENTS

| | | | |
|---|---|---|---|
| 5,890,152 A | 3/1999 | Rapaport et al. | |
| 6,175,840 B1 * | 1/2001 | Chen et al. | 715/210 |
| 6,297,824 B1 * | 10/2001 | Hearst et al. | 715/848 |
| 6,321,209 B1 | 11/2001 | Pasquali | |
| 7,069,192 B1 * | 6/2006 | Freitag | 703/1 |
| 7,092,735 B2 | 8/2006 | Osann, Jr. | |
| 7,606,923 B2 * | 10/2009 | Tam | 709/230 |
| 7,728,712 B2 * | 6/2010 | Girgis et al. | 340/7.48 |
| 8,060,820 B2 * | 11/2011 | Bedi et al. | 715/256 |
| 8,300,082 B2 * | 10/2012 | Malik | 348/14.08 |
| 8,571,524 B2 * | 10/2013 | Atarius | 455/412.1 |
| 2002/0085029 A1 * | 7/2002 | Ghani | 345/751 |
| 2002/0172338 A1 | 11/2002 | Lee et al. | |
| 2003/0053612 A1 * | 3/2003 | Henrikson et al. | 379/202.01 |
| 2003/0110117 A1 * | 6/2003 | Saidenberg et al. | 705/36 |
| 2003/0110228 A1 * | 6/2003 | Xu et al. | 709/207 |
| 2003/0221167 A1 | 11/2003 | Goldstein et al. | |
| 2005/0239401 A1 * | 10/2005 | Nam | 455/3.06 |
| 2006/0069990 A1 | 3/2006 | Yozell-Epstein et al. | |
| 2006/0129933 A1 * | 6/2006 | Land et al. | 715/723 |

(Continued)

FOREIGN PATENT DOCUMENTS

EP 1643426 4/2006

OTHER PUBLICATIONS

Chavez et al., U.S. Appl. No. 12/722,262, Entitled "Sequenced Telephony Applications Upon Call Disconnect Method and Apparatus", filed Mar. 11, 2010, 25 pages.

(Continued)

*Primary Examiner* — Ryan Pitaro
*Assistant Examiner* — Mahelet Shiberou
(74) *Attorney, Agent, or Firm* — Sheridan Ross P.C.

(57) ABSTRACT

Methods and systems for displaying content are provided. More specifically, an integrated content application is provided in which related content is displayed in a single window user interface. The content displayed can be determined by instructions received by the integrated content application. Different items of content can be displayed in sequence, but are not displayed simultaneously. Moreover, one item of content can provide context for another item of content. In addition, one item of content can be presented in non-real time, while the other related item of content can be presented in real time.

19 Claims, 4 Drawing Sheets

(56) References Cited

U.S. PATENT DOCUMENTS

| | | | |
|---|---|---|---|
| 2006/0236328 A1* | 10/2006 | DeWitt | 719/329 |
| 2006/0265496 A1* | 11/2006 | Freitag | 709/224 |
| 2007/0011258 A1* | 1/2007 | Khoo | 709/206 |
| 2007/0226762 A1* | 9/2007 | Girgis et al. | 725/33 |
| 2007/0239825 A1* | 10/2007 | Walter | 709/204 |
| 2008/0101566 A1 | 5/2008 | Medved et al. | |
| 2008/0256487 A1* | 10/2008 | Kim et al. | 715/810 |
| 2008/0261575 A1 | 10/2008 | Heikinheimo | |
| 2008/0267222 A1* | 10/2008 | Leung et al. | 370/503 |
| 2008/0301245 A1 | 12/2008 | Estrada et al. | |
| 2009/0013282 A1* | 1/2009 | Mercer | 715/788 |
| 2009/0016323 A1* | 1/2009 | Ethier et al. | 370/352 |
| 2009/0138920 A1 | 5/2009 | Anandpura | |
| 2009/0249222 A1* | 10/2009 | Schmidt et al. | 715/751 |
| 2010/0023398 A1* | 1/2010 | Brown et al. | 705/14.49 |

OTHER PUBLICATIONS

Chavez et al., U.S. Appl. No. 12/722,263, Entitled "Communications Session Preparation Method and Apparatus", filed Mar. 11, 2010, 30 pages.

"Viewing the Content Window", available at http://www.apexchange.com/help/Viewing_the_Content_window.htm, The Associated Press, 2010, 9 pages.

Partial Search Report for European Patent Application No. 10172578.6, mailed Mar. 26, 2012 6 pages.

Extended Search Report for European Patent Application No. 10172578.6, dated Jul. 30, 2012 11 pages.

Official Action with English Translation for Korea Patent Application No. 2010-0081094, dated Sep. 3, 2013 7 pages.

* cited by examiner

VIDEO WINDOW WITH INTEGRATED CONTENT

CROSS-REFERENCE TO RELATED APPLICATIONS

This application claims the benefit of U.S. Provisional Patent Application Ser. No. 61/235,838, filed Aug. 21, 2009, the entire of disclosure of which is hereby incorporated herein by reference.

FIELD

The present invention is generally directed to communications systems, and to the provision of an application for presenting video content information to introduce content in a common display segment.

BACKGROUND

Communications devices and systems are commonly used to support communications between two or more parties at different locations from one another. For example, conference calls between users at multiple locations are common. In order to facilitate the exchange of information during conference calls, video conferencing capabilities have been developed. Video conferencing capabilities can include electronic whiteboards or other applications and systems to display or otherwise exchange information between conference participants. Such systems have typically been implemented using specialized video conferencing equipment.

In connection with a real time, non-real time, or combined communications sessions, a user may need to access media and/or communication streams of different types. Doing so has typically required that the user of a communication device manually select between different applications to access the different media and/or communication streams. In addition to being inconvenient, the use of different applications commonly results in the generation of multiple windows within the display of the user's communication device, creating a cluttered user interface.

Mobile communication devices are increasingly relied on by users as a primary means of communication. Most mobile devices have a relatively compact format. In particular, the display capabilities of mobile devices may be relatively limited. As a result, it can be difficult or impossible for a user of a mobile device to fully participate in video or other conferences, or to access recorded information, when information is exchanged using visual displays. For example, as noted, where multiple applications are used to exchange information in association with a conference session, those applications have each occupied a different window. The resulting multiplicity of windows can be difficult to manage on many communication endpoints, and in particular on communication endpoints having limited display capabilities. The limitations of communication device displays are especially apparent where the communication device relies on a touch screen interface for receiving input from the user of the device. In particular, in connection with such devices, the display area available for presenting content that is the subject of a communications session or conference is limited.

SUMMARY

Embodiments of the present invention are directed to solving these and other problems and disadvantages of the prior art. According to embodiments of the present invention, information is provided to a user serially in a single window or dialog box. More particularly, embodiments of the present invention provide a single window user interface for presenting content, including different items of content associated with different applications, to the participants of a communications session.

In accordance with embodiments of the present invention, an integrated content application presents content, such as sending party information, context information, header information, text, presentations, video, audio or other content serially using a single window. Moreover, the integrated content application provides an application that allows media or other content formatted according to different applications to be presented in a single window. For example, content comprising a recorded video formatted according to a first application can be displayed by the integrated content application in the single window, and that first content can be replaced in the single window by additional content comprising a text document.

A communications system in accordance with embodiments of the present invention can include one or more communication devices capable of supporting real time communications and/or non-real time communications over a communication network. In addition, the communication devices include a display capable of presenting content to a user. Moreover, one or more of the communication devices executes or has access to an integrated content application through which different items of content are presented to the user of the communication device in the single window. The integrated content application can display content in a single window in accordance with instructions or scripts. Alternatively or in addition, the integrated content application can receive input from an associated user that can be used to control the content presented by the single window user interface. More particularly, the integrated content application is capable of presenting content of different types to users in sequence through a single window displayed by a communication device in response to user input or pre-arranged scripts.

Additional features and advantages of embodiments of the present invention will become more readily apparent from the following description, particularly when taken together with the accompanying drawings.

DETAILED DESCRIPTION

Figure 1:
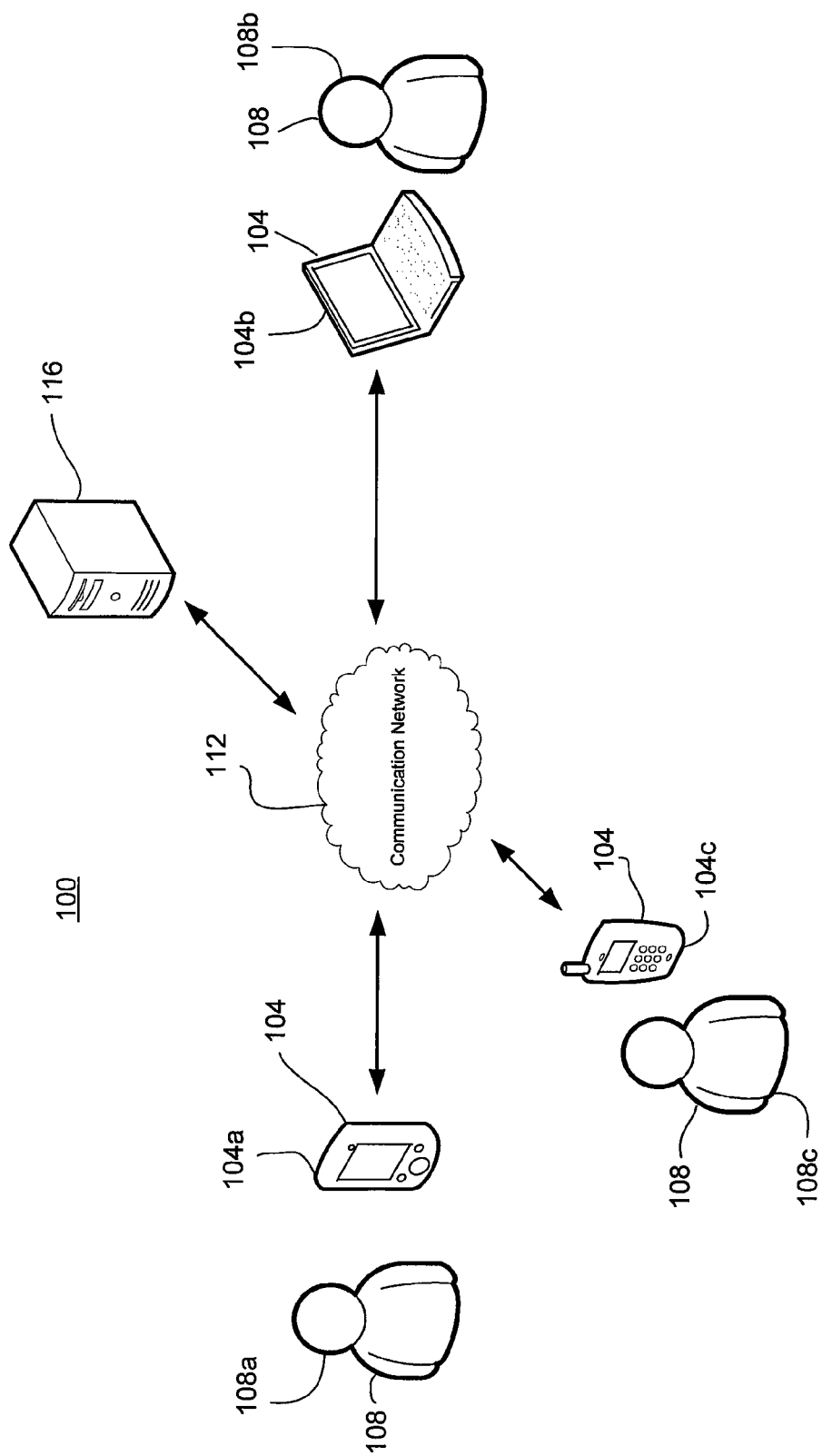
FIG. 1 depicts a communications system in accordance with at least some embodiments of the present invention.

With reference to FIG. 1, an exemplary communications system 100 will be described in accordance with at least some embodiments of the present invention. In general, the communications system comprises a plurality of communication devices 104, each associated with one or more users 108. In the example of FIG. 1, a first communication device 104*a* associated with a first user 108*a* comprises a smart phone type device. A second communication device 104*b* associated with a second user 108*b* comprises a laptop computer. A third communication device 104*c* associated with a third user 108*c* comprises a cellular telephone. Although particular examples of communication devices 104 have been presented, it should be appreciated that a communication device 104 in accordance with embodiments of the present invention is not limited to such examples. In particular, a communication device 104 can be any device capable of supporting real time and/or non-real time communications established in connection with a communication network 112. Moreover, at least one of the communication devices 104 included in a communications system 100 in accordance with embodiments of the present invention includes the capability of displaying a single window or dialog box operated in accordance with a single window session application, as described herein.

The communication network 112 interconnecting the communication devices 104 may comprise any type and any number of communication mediums capable of supporting communications sessions or exchanges of content, such as voice calls, video calls, chats, emails, TTY calls, multimedia sessions, or the like. The communication network 112 may include a LAN, a WAN, a SIP network, and any other type of packet switch or circuit switched network known in the art. In addition, it can be appreciated that the communication network 112 need not be limited to any one network type, and instead may be comprised of a number of different networks and/or network types. The communication network 112 may include an IP multimedia subsystem (IMS) network, an architectural SIP standard well known in the art, or any other type of network that provides access to one or more of the Internet, a standard plain old telephone system (POTS), an integrated services digital network (ISDN), the public switched telephony network (PSTN), and/or any type of known cellular or other wireless communication network. Moreover, the communication network 112 may comprise the Internet. Accordingly, the communication network 112 is equipped to facilitate and support communications between communication devices 104 via one or more communication media and/or modalities.

Also included in the communications system 100 illustrated in FIG. 1 is a server computer 116. Although not required, the inclusion of a server computer 116 can allow some or all functions performed in support of a communications session between communication devices 104 to be performed by or in connection with the server computer 116. For example, execution of an integrated content application as described herein can be performed by one or more server computers 116, in support of one or more communication devices 104. Alternatively or in addition, a server computer 116 can function as a repository or store of data comprising content displayed through an integrated content application as described herein, even where the display of such content is not part of a real time communications session.

Figure 2:
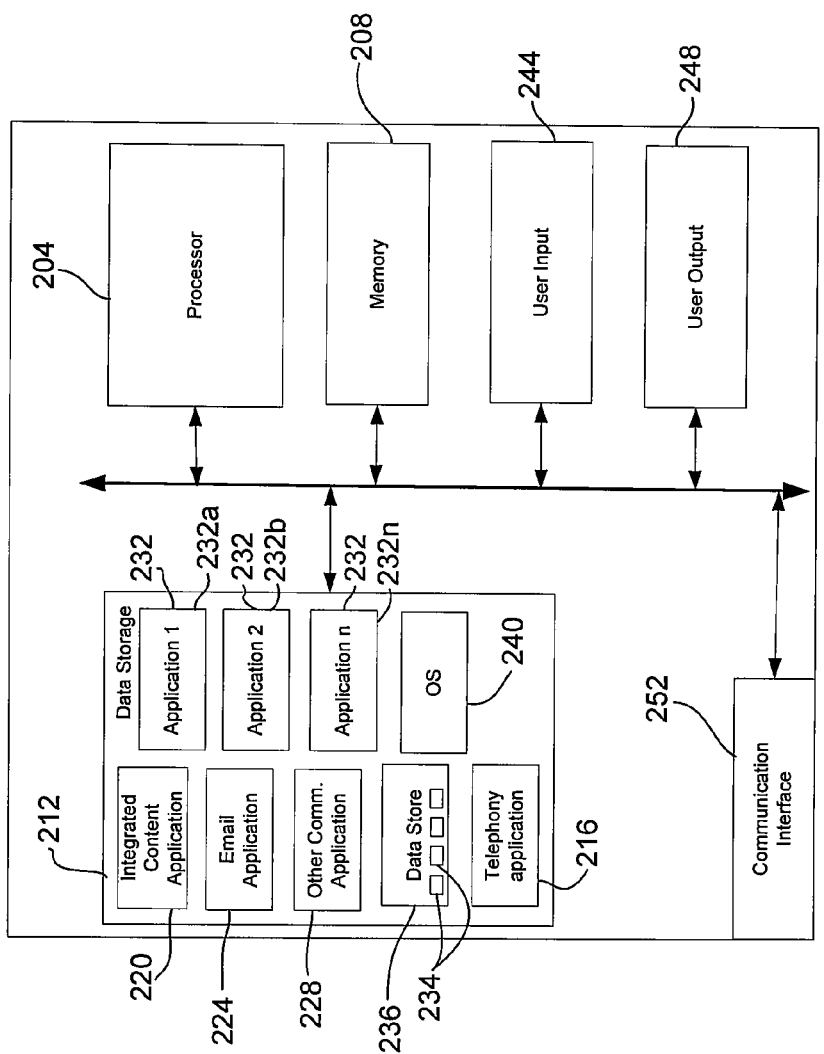
FIG. 2 is a block diagram depicting components of a communications device in accordance with embodiments of the present invention.

With reference now to FIG. 2, aspects of a communication device 104 included in a communications system 100 in accordance with embodiments of the present invention, are illustrated. In general, each communication device 104 includes a processor 204 capable of executing program instructions or software. Accordingly, the processor 204 may include any general purpose programmable processor or controller for executing application programming or instructions. As a further example, the processor 204 may comprise a specially configured application specific integrated circuit (ASIC). The processor 204 generally functions to run programming code or instructions implementing various of the functions performed by the communication device 104. As will be described in greater detail elsewhere herein, such functions may include support of communications sessions and sharing of content in a single window of a display through or in connection with the execution of an integrated content application as described herein.

A communication device 104 may additionally include memory 208 for use in connection with the execution of programming by the processor 204, and for temporary or long term storage of program instructions and/or data. As examples, the memory 208 may comprise RAM, SDRAM, or other solid state memory. Alternatively or in addition, data storage 212 may be provided. In accordance with embodiments of the present invention, data storage 212 can contain program instructions or code implementing various of the applications executed by the communication device 104, and data that is used and/or generated in connection with the execution of applications. Like the memory 208, the data storage 212 may comprise a solid state memory device. Alternatively or in addition, the data storage 212 may comprise a hard disk drive or other random access memory. In accordance with still other embodiments, the memory 208 may provide random access storage, while some or all of the data storage 212 may comprise read only storage.

Examples of application programming or instructions that can be stored in data storage 212 include a telephony application 216. In addition, in accordance with embodiments of the present invention, a communication device 104 can include an integrated content application 220. A communication device 104 may also include an email application 224, or other communication application 228. In accordance with still other embodiments, the data storage 212 of a communication device 104 may store a number of other applications 232*a-n*. Examples of such other applications 232 include word processing, spreadsheet, presentation, drawing, multimedia presentation, calendar, or other applications. At least some of the applications 232 are operable to display content 234. Moreover, the data storage 212 may provide a data store 236 for example for storing content 234, and storage for operating system software 240.

A communication endpoint 104 also generally includes one or more user input devices 244. Examples of user input devices include a touch screen display, a keyboard, a pointing device combined with a display screen or other position encoder, a microphone or other audible input device, and a keypad. In addition, a communication device 104 generally includes one or more user output devices 248. Examples of user output devices 248 include a display, an audio output device, and indicator lamps. A communication device 104 also generally includes one or more communication network interfaces 252. Examples of communication network interfaces 252 that may be provided as part of a communication device 104 include a packet data network interface, such as a wired or wireless Ethernet interface or cellular packet data interface, a telephony network interface, and/or other wireless or wire line interfaces.

Figure 3:
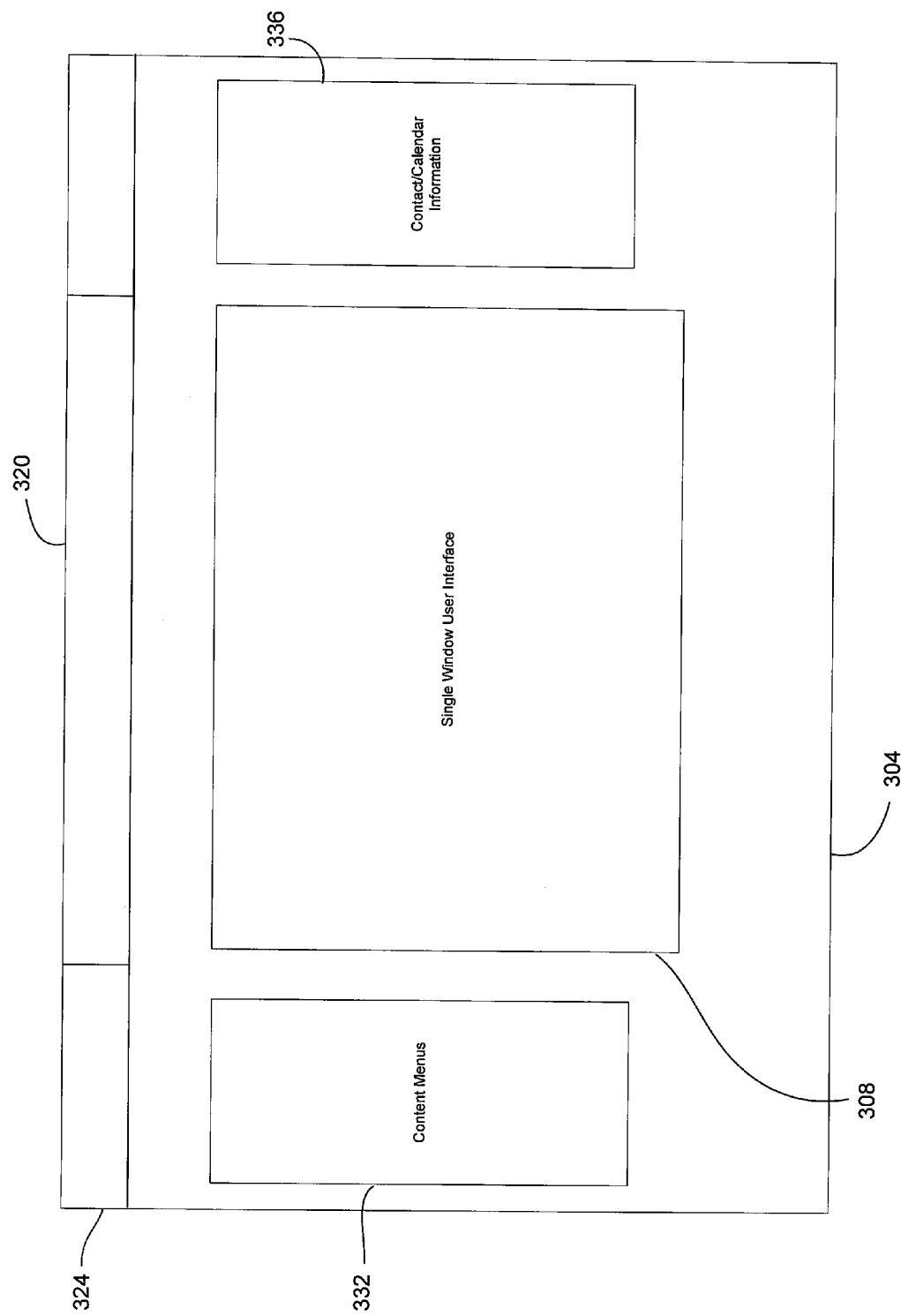
FIG. 3 depicts an exemplary communications device display in accordance with embodiments of the present invention.

FIG. 3 depicts a graphical user interface 304 displayed to a user 108 of a communication device 104. More particularly, the example graphical user interface 304 is displayed by a user output 248 comprising a visual display of the communication device 104. In addition, the graphical user interface 304 presents one or more elements to the user 108 that are generated through or in cooperation with the execution of an integrated content application 220. More particularly, the graphical user interface 304 includes a session window 308 comprising a single window user interface generated by or in association with execution of the integrated content application 220 running on or accessed by the communication endpoint 104. More particularly, the integrated content applications 220 can present content or portions of content 234 that is related to other content or portions of content 234 in the session window 308 in series. Alternatively or in addition, integrated content applications 220 can present content or portions of content 234 in the session window 308 that is the subject of or related to a communications session between two or more communication devices 104. Moreover, integrated content applications 220 can present the same information in the single window user interface 308 on the displays of each communication device 104 participating in the communications session.

The content presented by the single window user interface 308 can be determined by instructions or simply included in or associated with the content 234, or it can be determined by input provided by one or more of the users 108. In accordance with embodiments of the present invention, different application content 234 can be selected and displayed in the single window user interface 308 in series. For example, instructions to display second content 234 formatted for execution and/or display in connection with a second application 232 after first content 234 formatted for display in association with a first application 232 result in the display of the first content 234 in the single window user interface 308 being replaced by a display of the second content 234 in the single window user interface 308. Accordingly, the sequential display of new or additional content 234 does not result in the display and/or creation of additional windows. Instead, multiple pieces of content 234 are displayed in series in the single window user interface 308. In addition, a user 208 can enter input that is applied to content 234 displayed in the single window user interface 308 by the integrated content application 220 even though the content 234 is stored on another communication device 104 or on a server 116.

In accordance with embodiments of the present invention, different items of content 234 can be displayed in the single window user interface 308 by the integrated content application 220 even though the different items of content 234 require the invocation of different applications 232 for such display and/or execution. In accordance with further embodiments, the particular application 232 invoked for display of content 234 by the single window user interface 308 determines the behavior of the single window user interface 308 in response to the receipt of input or other commands from a user 108. For instance, while a first key combination provided as input while a first application 232 is active in the single window user interface 308 may invoke a first action, that same key combination may be effective to invoke a second action when a second application 232 is active in connection with the content 234 displayed by the single window user interface 308.

Examples of other information that may be presented by a graphical user interface 304 in accordance with embodiments of the present invention includes communications session status and/or identification information 320, time and date information 324, and user 108 presence information 328. Still other examples include application and/or content menus 332, email messages, documents on local storage, related new and links from the web, and contact information and/or calendar information 336.

Figure 4:
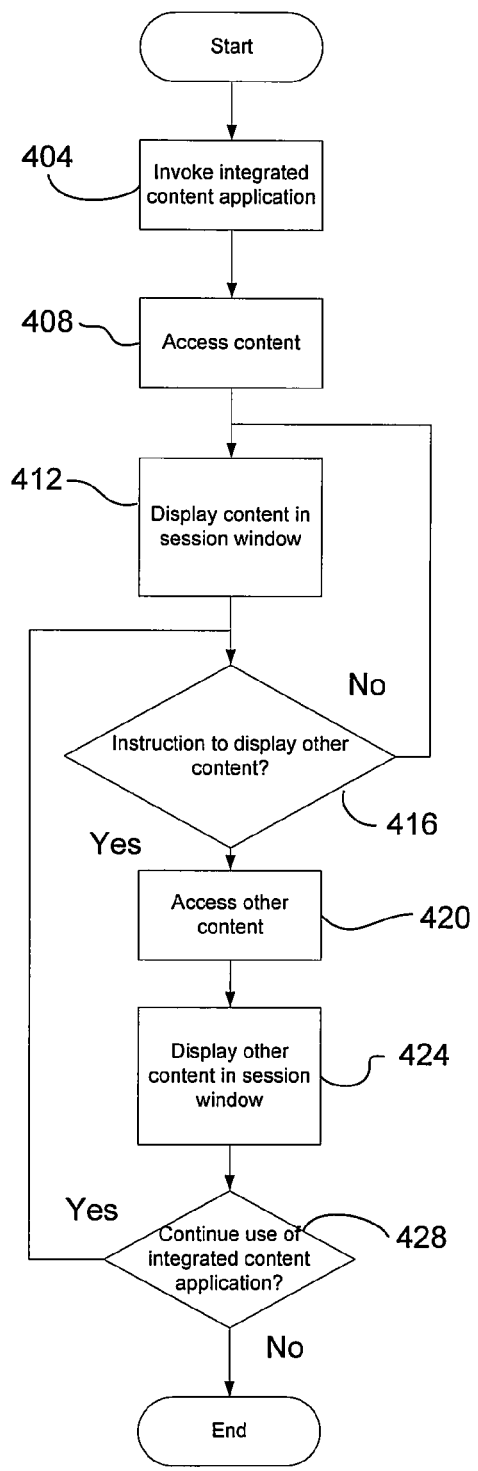
FIG. 4 is a flowchart illustrating aspects of the operation of a communications system incorporating an integrated content application in accordance with embodiments of the present invention.

With reference now to FIG. 4, aspects of the operation of a communications system 100 and in particular of an integrated content application 220 included in the communications system 100 in accordance with embodiments of the present invention are illustrated. Initially, the integrated content application 220 is invoked (step 404). Invoking the integrated content application 220 can include executing a script or set of instructions. Moreover, the script or set of instructions can include an identification of content 234 for presentation to a user 108 by the integrated content application 220 through a single user interface 308 of the user's communication device 104. In accordance with still other embodiments, invoking an integrated content application 220 can include selecting content 234 by a user 108 of a communication device 104, in connection with or through the integrated content application 220. In accordance with still other embodiments, a script for invoking the integrated content application 220 can be included in or associated with content 234, and can be executed in response to the selection of such content 234. Regardless of how the integrated content application 220 is invoked, associated content 234 is accessed (step 408) and that content or portions of that content 234 are displayed by the integrated content application 220 in the single window user interface 308 (step 412).

At step 416, a determination may be made as to whether an instruction to display other content 234 has been received. As with the initial display of content 234, an instruction to display other content 234 can be included as part of a script executed by the integrated content application 220, whether that script is a stand alone set of instructions or included in a collection of content 234, or in response to user input. If an instruction to display other content 234 is not received, the previously accessed content 234 may continue to be displayed in the single window user interface 308. If instructions to display other content 234 have been received, that other content 234 is accessed (step 420). Accessing the other content 234 can include accessing a file comprising that content 234, accessing a media or communication data stream comprising that content 234, or proceeding to access content 234 stored as part of the previously accessed content 234. The other content 234 is then displayed in the single window user interface (step 424). In accordance with still other embodiments, an item of content 234 can be displayed overlayed other content 234. In accordance with still other embodiments, an item of content 234 can be displayed as a picture within a picture comprising another item of content 234.

At step 428, a determination may be made as to whether use of the integrated content application 220 is to be continued. If use of the integrated content application 220 is to be continued, the process may return to step 416. If use of the integrated content application 220 is to be discontinued, the process may end.

In accordance with embodiments of the present invention, an integrated content application 220 can be stored and executed locally on a communication device 104. Alternatively or in addition, an integrated content application 220 in accordance with embodiments of the present invention can be provided by and executed on, in whole or in part, a server 116 interconnected to a communication device 104 by the communication network 112. In accordance with still other embodiments, an integrated content application 220 may be executed by a communication device 104 on behalf of a peer communication device. Accordingly, an integrated content application 220 can be provided from the "cloud", as software as a service, or any other software application made available to users on either a subscription basis, paid for according to use, available for purchase, or provided by one user to another to facilitate communications.

The following example is provided for purposes of illustrating the operation of an integrated content application 220 in accordance with embodiments of the present invention. The integrated content application 220 may be executed by a communication device 104 presenting content 234 to the user 108 of that communication device 104. Execution of the integrated content application 220 can be initiated in response to the selection of an item of content 234 by the user 108, through interaction with the graphical user interface 304 of the communication device 104. For instance, the user 108 may select an icon representing a file comprising the content 234. For example, the content 234 may comprise an email message. In response to accessing the content 234 representing the email message, a script directing the integrated content application 220 to open another item of content 234 may be encountered. As a result, the integrated content application 220 may access that other content 234. In this example, that other content 234 may comprise a video clip introducing the subject matter of the email message. As further examples, the video clip could introduce the sender of the email message, the sender's organization, or other information. The content 234 comprising the video clip is presented to the user 108 in the single window user interface 308, in combination with audio output provided by a user output 248 also associated with the communication device 104 comprising a speaker. Upon the conclusion of the video clip, the text of the email message may be displayed in the single window user interface 308. The display of the message text may be in response to the script that was loaded when the content 234 comprising the email message was originally accessed by the user 108. Alternatively, the text of the message can be displayed in response to a script or instruction encountered at the conclusion of the content 234 comprising the video clip.

In accordance with other examples, an integrated content application 220 can be used in connection with a combination of real time and non-real time communications. For instance, an integrated content application 220 can be invoked by a calendar application in advance of a calendared conference call. In connection with the invocation of the integrated content application 220, content 234 associated with the scheduled conference call can be accessed and presented by the single window user interface 308 of the user's communication device 104. At the conclusion of the video clip, the integrated content application 220 can initiate a call to the other party or parties to the communications session, can initiate a message to such other parties indicating that the video clip comprising the first item of content 234 has been presented to the user 108 of the communication device 104, or can pause an incoming call or other information or content. In response to the establishment of the scheduled communications session, content 234 comprising information related to that communications session can be presented in the single window user interface 308. Such information can include video information, for example where the communications session comprises a video telephony call. As a further example, the content 234 presented by the single window user interface 308 can include information identifying the participants of the call, call duration, or other information, for example where the communications session comprises a voice call.

In accordance with embodiments of the present invention, as different content 234 is displayed, the appropriate application 232 is invoked to appropriately present the content 234. Accordingly, as illustrated in this non-limiting example, embodiments of an integrated content application 220 can facilitate communications between users 108 of communication devices 104 by providing a convenient means through which content 234 is introduced and displayed in a single window user interface 308, and that allows different content 234 to be displayed in sequence, while avoiding the creation of multiple windows presenting such content 234. Instead, the content is displayed sequentially in the single window user interface 308.

As can be appreciated by one of skill in the art from the disclosure presented herein, embodiments of the present invention provide an integrated content application 220 to sequentially display content 234 to participants in a communications session through a single window user interface 308. The content 234 presented to a user 108 can include content providing information that provides a context for other content 234. Moreover, all of the content 234 can be presented in association with or by a single window user interface 308. The use of a single window user interface 308 avoids the problem of displays containing multiple windows. Accordingly, embodiments of the present invention have particular application, but are not limited to, use in connection with communication devices 104 with limited visual displays.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for presenting content, comprising:
providing first and second content to an integrated content application running on a first communication device;
using the integrated content application, displaying the first content in a first window on a display of the first communication device, wherein the first content is formatted according to a first application;
in response to instructions received at the integrated content application, an instruction to display the second content, using the integrated content application, displaying the second content in the first window on the display of the first communication device, wherein the second content is formatted according to a second application, wherein the first and second content are presented in series, wherein the instruction to display the second content is included in the first content, wherein the first content is a video clip, and wherein the instruction to display the second content automatically causes the second content to replace the display of the first content in the first window in response to a conclusion of the video clip being played;
receiving a selection of an email file by a user;
accessing content of the email file;
in response to accessing the content of the email file, detecting a script that opens the first content; and
displaying a text message of an email in the email file based on the video clip being played.

2. The method of claim 1, wherein the first content is rendered by the first application, wherein the second content is rendered by the second application.

3. The method of claim 2, wherein results in the performance of a first function with respect to the first content when the first content is displayed in the first window, wherein the first selection performs a second function with respect to the second content when the second content is displayed in the first window.

4. The method of claim 1, wherein the first content includes recorded content, and wherein the second content includes a real time communication.

5. The method of claim 1, further comprising:
receiving second input at the first communication device from a first user, wherein the second input includes an instruction to allow a second user to provide input at a second communication device to modify the first content displayed within the first window on the displays of the first and second communication devices;
receiving third input at the second communication device from the second user, wherein the third input includes a second modification of the first content displayed within the first window on the display of the first and second communication devices.

6. The method of claim 1, wherein the first communication device and a second communication device are engaged in a communication session, and wherein the communication session includes the exchange of voice information between a first user of the first communication device and a second user associated with the second communication device.

7. The method of claim 1, further comprising initiating a voice call to another party in response to the conclusion of the video clip being played.

8. The method of claim 1, wherein the second content further comprises a message that is sent to another user that indicates that the first content has been displayed.

9. The method of claim 1, wherein the instruction to display the second content further comprises an instruction to pause an incoming call in response to the conclusion of the video clip being played.

10. The method of claim 1, wherein the instruction to display the second content automatically in response to the conclusion of the video clip being played is a script that is loaded when the second content is first accessed by a user.

11. The method of claim 1, wherein the video clip introduces a sender of the second content.

12. A communication system, comprising:
a first communication device, including:
a user output, including a display;
a user input;
a communication network interface;
memory, wherein instructions for executing an integrated content application are stored; and
a processor, wherein the processor is operable to (a) execute the integrated content application, wherein first content formatted according to a first application is displayed in a first window on the display of the first communication device, wherein in response to input received by the integrated content application, second content formatted according to a second application is displayed in the first window on the display of the first communication device, wherein the first content and the second content are displayed in series, wherein the first content includes an instruction to display the second content, wherein the first content is a video clip, and wherein the instruction to display the second content automatically causes the second content to replace the display of the first content in the first window in response to a conclusion of the video clip being played, (b) receive a selection of an email file by a user, (c) access content of the email file, (d) detect a script that opens the first content in response to accessing the content of the email file, and (e) display a text message of an email in the email file based on the video clip being played.

13. The communication system of claim 12, further comprising:
a second communication device, including:
a user output, including a display;
a user input;
a communication network interface;
memory; and
a processor, wherein the second communication device is associated with a first communication session established with the first communication device, wherein the first content is displayed in a first window on the display of the second communication device, wherein in response to the input received by the integrated content application of the first communication device second content is displayed in the first window on the display of the second communication device.

14. The communication system of claim 13, wherein instructions for executing a first instance of the integrated content application are stored in the memory on the first communication device, wherein instructions for executing a second instance of the integrated content application are stored in the memory of the second communication device, wherein the processor of the second communication device is operable to execute the second instance of the integrated content application.

15. The communication system of claim 14, further comprising:
a communication network, wherein the communication network interface of the first communication device is interconnected to the communication network, wherein the communication network interface of the second communication device is interconnected to the communication network, and wherein the first communication session is established over the communication network.

16. The communication system of claim 15, wherein second input received at the user input of one of the first and second communication devices modifies the second content, and wherein modified second content is displayed in the first window on the display of the first communication device and in the first window on the display of the second communication device.

17. The communication system of claim 16, further comprising a third communication device, including:
a user output, wherein the user output does not include a display operable to display the first or second content in a first window;
a user input;
a communication network interface, wherein the communication network interface of the third communication device is interconnected to the communication network, wherein the third communication device is associated with the first communication session, wherein the first and second content are not displayed by the third communication device.

18. The communication system of claim 12, wherein the first window is a single window user interface.

19. A system for presenting content, including:
a first communication device;
an integrated content application executed by a processor;
first content associated with a first application, wherein the first content is displayed on a display of the first communication device by the integrated content application in a single window user interface, wherein, in response to instructions received by the integrated content application, second content associated with a second application is displayed on the display of the first communication device in the single window user interface, wherein the second content replaces the first content in the display of the first communication device, wherein the display of the first content is complete when the second content is displayed, wherein the second content replaces the first content in response to an instruction included in the first content, wherein the first content is a video clip, and wherein the instruction to display the second content automatically causes the second content to replace the display of the first content in the first window in response to a conclusion of the video clip being played; and wherein the system performs operations further comprising:

receiving a selection of an email file by a user;

accessing content of the email file;

detecting a script that opens the first content in response to accessing the content of the email file; and displaying a text message of an email in the email file based on the video clip being played.

* * * * *